May 7, 1963   B. G. HOCKADAY ETAL   3,088,449
TRANSMISSION SHIFTER CONTROLS
Filed Nov. 20, 1959   5 Sheets-Sheet 1

INVENTORS
Francis H. Grady,
Brooks H. Short,
Beverly G. Hockaday, &
Charles E. Bates
BY
Hugh L. Fisher
ATTORNEY May 7, 1963  B. G. HOCKADAY ETAL  3,088,449
TRANSMISSION SHIFTER CONTROLS
Filed Nov. 20, 1959  5 Sheets-Sheet 5

INVENTORS
Francis H. Grady,
Brooks H. Short,
BY Beverly G. Hockaday &
Charles E. Bates Hugh L. Fisher
ATTORNEY United States Patent Office
3,088,449
Patented May 7, 1963

3,088,449
TRANSMISSION SHIFTER CONTROLS
Beverly G. Hockaday, Indianapolis, Ind., Francis H. Grady, Pontiac, Mich., and Brooks H. Short and Charles E. Bates, Anderson, Ind., assignors to General Motors Corporation, Detroit, Mich., a corporation of Delaware
Filed Nov. 20, 1959, Ser. No. 854,378
18 Claims. (Cl. 123—179)

This invention relates generally to manually operated controls and particularly to manually operated controls adapted, although not exclusively, for shifting transmissions.

Heretofore, it has been customary to make the connection between the transmission and a driver operated control by linkage or a cable. Linkage connections present problems because of the tolerance build-up from link to link and also because of the inherent lost motion. Moreover, since the linkage tends to deform and additionally is space-consuming as well as expensive, it can be seen that it does not offer a very effective mode of transferring movements over large distances, e.g., to a rear end mounted transmission. As for cables, adequate leverage for effortless operation becomes a problem and also cable slack is a concern.

Accordingly, the invention proposes a manually operated control that employs a unique cable and pulley construction for transferring movements between a manually operated member and some member to be operated. More specifically, the invention contemplates shifting a transmission through the agency of novel cable and pulley structure that is especially suited for mass production techniques being relatively free from the influence of dimensional variations from part to part; that is suited for many different applications; that is particularly adapted to transfer movements substantial distances without lost motion and without deforming under load; that has provision for rendering different vehicle accessory systems effective in different settings; that is adapted to prevent inadvertent operation; and that is easily altered so as to furnish adequate leverage ratios for relatively effortless operation.

Another problem that is particularly a concern in vehicle transmission controls is the vehicle final assembly line, for during the final vehicle assembly, it is customary to drop the body on to the chassis and at this time the connection between the transmission and the manual transmission control in the driver compartment must be made. Obviously, the making of this connection must be accomplished quickly or there is considerable time lost usually due to the failure to keep pace with the other assembly line operation.

With this concern in mind, the invention provides a control of a construction that is especially adapted for sub-assembly type fabrication. Specifically, the manual control is assembled and installed as one unit to the vehicle body and the transmission control as another unit to the chassis mounted transmission so that thereafter a simple and quick assembly act completes the assemblage.

The foregoing and other objects and advantages of the invention will be more apparent from the following description and from the accompanying drawings in which.

Figure 1:
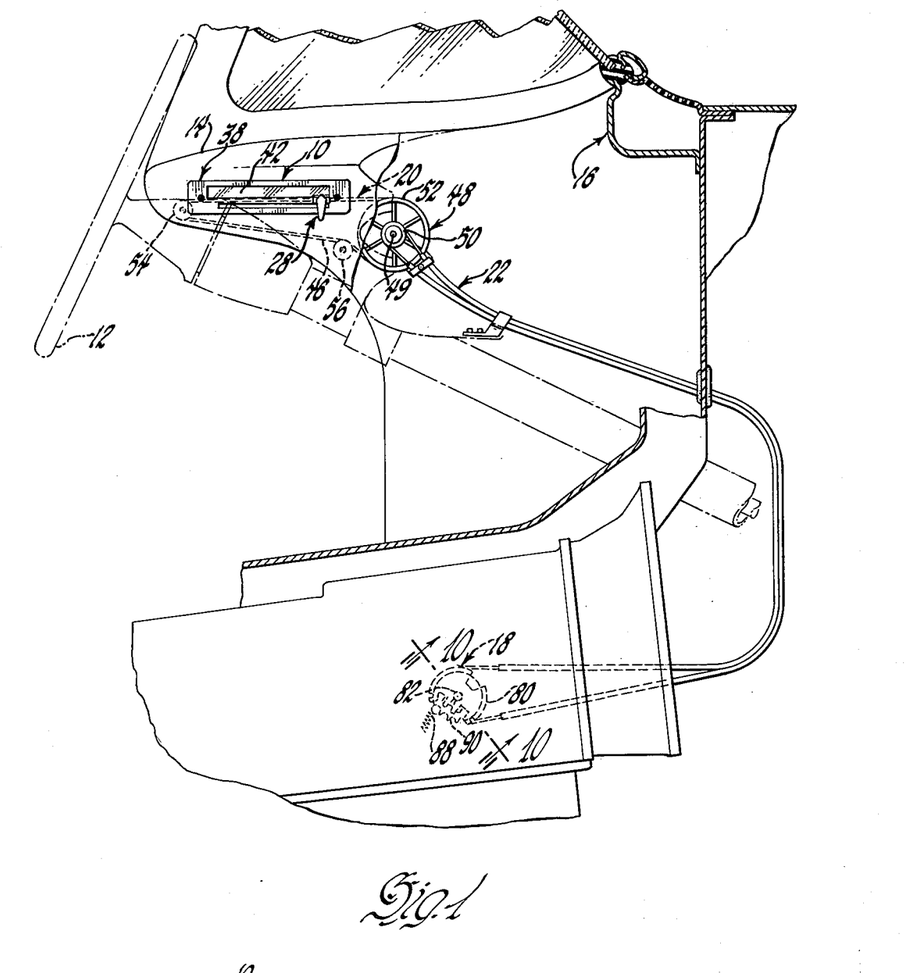
FIGURE 1 is a view of a vehicle transmission control incorporating the principles of the invention.

Referring in detail to the drawings and first to FIGURE 1, the numeral 10 denotes a manually operable control, which in this embodiment is lefthand operated being stationed to the left of a steering wheel 12 and on a horn part 14 of the vehicle instrument panel viewed generally at 16. If desired, the control 10 can be located elsewhere and adapted for righthand operation or made accessible for operation by either hand. In the demonstrated embodiment, the movements of the manually operable control 10 are transferred to a transmission control viewed generally at 18 by input and output cable structures 20 and 22. Thus, as will become apparent, the manually operable control 10 can be maneuvered to various settings such as Reverse, Drive, Low, Neutral, and Park, and in so doing cause the transmission to be conditioned for the corresponding status.

Figure 2:
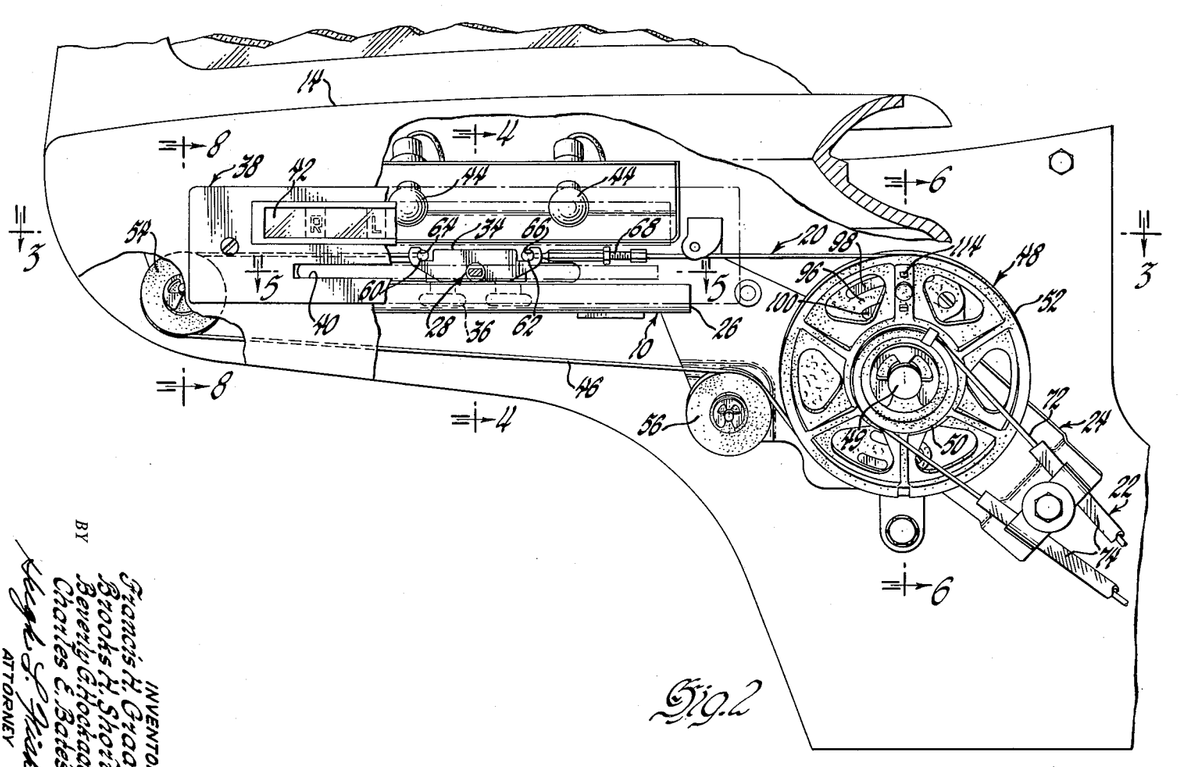
FIGURE 2 is an enlarged view of a manually operable part of the control.

The manually operable control 10 is best observed in FIGURE 2 and as there shown comprises a bracket 24 suitably attached to the instrument panel horn part 14. The bracket 24 is formed with a guide track 26 having a cross section similar to that demonstrated in FIGURE 4. The guide track 26 affords support for a manually operable shifter assemblage that is viewed generally at 28 and that includes a selector knob 30, which is attached to one end of a selector shaft 32. The selector shaft 32 is slidably mounted by a carriage 34, and the carriage, in turn through two rollers 36 depending therefrom, is slidably joined to the guide track 26. The rolling action afforded by the rollers 36 substantially eliminates the influence of friction, thereby providing relatively effortless operation of the manually operable control 10. This necessarily assumes that there is clearance between the guide track 26 and the rollers 36 at the side opposite that along which the rolling action is occurring.

Figure 3:
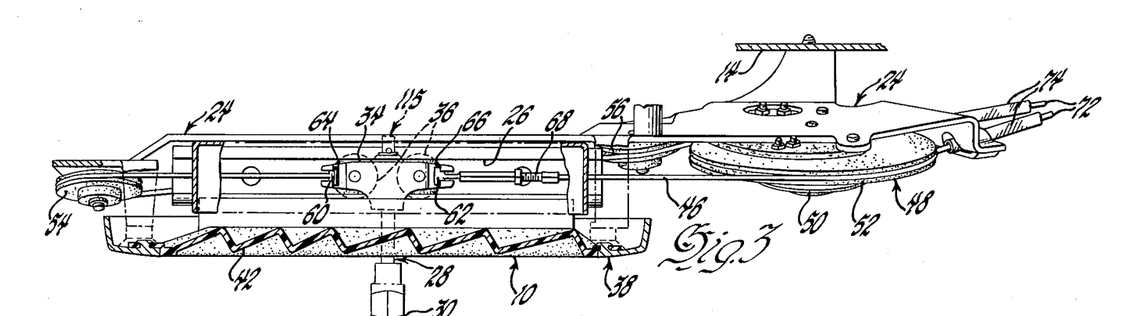
FIGURE 3 is a sectional view of the manually operable part taken along line 3—3 of FIGURE 2.

The assembly constituting the manually operable control 10 is completed by a bezel 38 secured to the bracket 24. The bezel 38 is provided with a slot 40 through which the selector shaft 32 extends and a lens 42. The lens 42, as can be seen in FIGURE 3, is of staggered configuration, and the letters, such as R and L, denoting the corresponding Reverse and Low transmission settings, are displayed as seen in FIGURE 2. The Reverse setting is preferably the last rearward setting so that the operator is compelled to move the selector knob 30 rearwardly when reverse operation is wanted.

This feature takes advantage of the normal tendency for an operator to move the control 10 in the direction of desired movement, particularly when emergencies arise.

The lens 42 is furnished light for night driving by lamps 44 disposed behind the lens 42. Any suitable source of current may be utilized for the lamps 44, such as the conventional vehicle battery.

Figure 8:
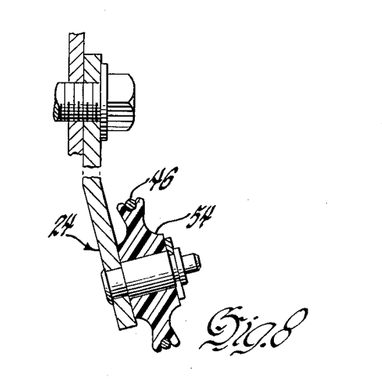
FIGURE 8 is a sectional view of a rear pulley for the manually operable part taken along line 8—8 of FIGURE 2.

The input cable and pulley structure 20 utilized to transfer the movements of the manual control 10 includes a cable 46 of any suitable material, such as steel and a pulley assembly 48 journaled on the bracket 24 at 49. The pulley assembly 48 as seen in FIGURE 2 has a small pulley 50 and a large pulley 52 formed either integrally or separately but made so as to revolve together. The relative sizes of the pulleys 50 and 52 will be determined by the leverage needed to operate the transmission control 18 and also the angular amount of rotation required to revolve the transmission control 18 to the different transmission settings. In this arrangement, the cable 46 extends around both the large pulley 52 and a rear end pulley 54, and the extent of engagement with the large pulley 52 is determined by a tension pulley 56. The latter pulleys 54 and 56 are rotatably supported on the bracket 24 in any suitable fashion, e.g., as seen in FIGURE 8. Cable 46 is provided at each end thereof with connectors 60 and 62 that engage respectively slots 64 and 66 in the carriage 34.

The amount of tautness in the cable 46 can be altered by a threaded adjustment at 68, this adjustment being sufficient to insure against pulley slippage and lost motion, but being such as to not cause the bearing loads on the pulleys to be excessive. Also, the adjustment insures that the manually operable control 10 can be actuated easily, but with a definite "feel."

Figures 10, 11:
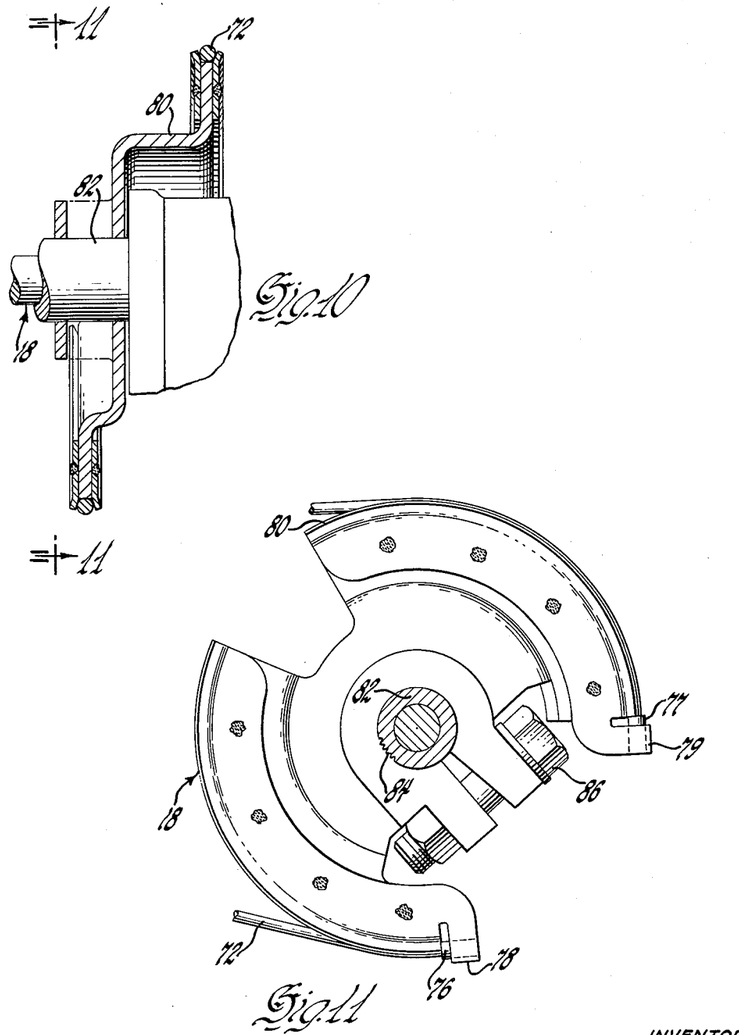
FIGURE 10 is a sectional view taken along line 10—10 of FIGURE 1 illustrating a transmission part of the control and a transmission shifter pulley employed thereby.
FIGURE 11 is an enlarged view of the transmission shifter pulley looking in the direction of arrows 11—11 in FIGURE 10.

The output cable and pulley structure 22 includes a cable 72 that extends around the small pulley 50 of the pulley assembly 48 and then through protective guide sheaths 74 to the transmission control 18. The ends of the cable 72 are furnished with connectors 76 and 77 that are secured, as viewed in FIGURE 11, to end track portions 78 and 79 of a transmission shifter pulley 80 by a suitable detachable clamp provision, this clamp provision facilitating quick assembly and disassembly. The transmission shifter pulley 80 is accurately positioned on a transmission shifter shaft 82 extending into the transmission through a key or knurl connection at 84. The shifter pulley 80 can be maintained in this position in any desired way as by clamping bolt 86.

From the foregoing, it can be seen that movement of the selector knob 30 will cause the cable 46 to revolve the large pulley 52 and accordingly the small pulley 50. As a result, the cable 72 will revolve the transmission shifter pulley 80 a proportional angular amount and to the desired setting. To afford the operator with a sensation or indication of each setting, a detent, such as the ball type depicted at 88 in FIGURE 1, is arranged so as to coact with a notched sector 90 that is revolvable with the shifter shaft 82. The various notches in the sector 88 correspond to each of the settings of the selector knob 30. If preferred, the detent provision can be installed elsewhere, for instance at the transmission selector control 10, and it can be of a similar type.

Figure 6:
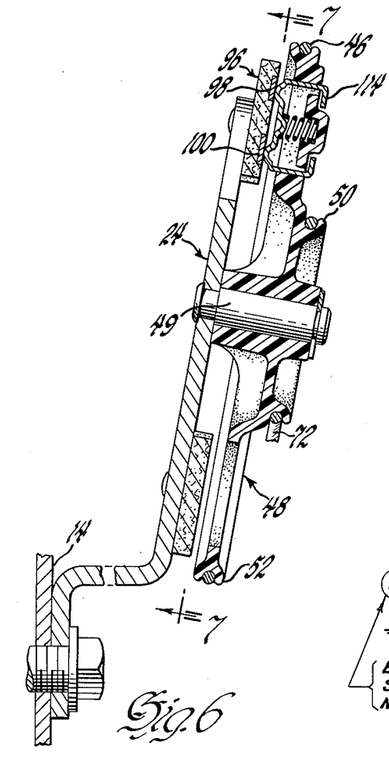
FIGURE 6 is a sectional view of a pulley assembly for the manually operable part of the control taken along line 6—6 of FIGURE 2.
Figure 7:
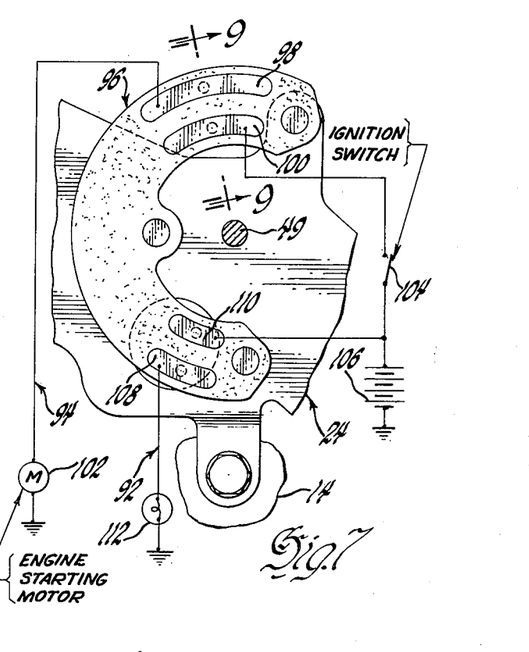
FIGURE 7 is both a circuit diagram and a fragmentary view taken along line 7—7 of FIGURE 6 together showing the relationship between the circuits and an insulator associated with the pulley assembly.
Figure 9:
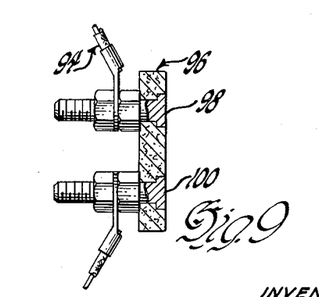
FIGURE 9 is a sectional view along line 9—9 of FIGURE 7 showing a set of contacts associated with the insulator.

The coordination of the various vehicle accessory systems, e.g., a back-up circuit 92 utilized in Reverse and an engine starting motor circuit 94 employed in Neutral or Park, with the manually operable control 10 is made by the structure illustrated in FIGURES 6 and 7. As there depicted, an annular insulator 96 is disposed behind the pulley assembly 48, i.e., between the pulley assembly 48 and the bracket 24, and has embedded therein, as illustrated in FIGURE 9, two sets of radially spaced contacts. One set, the engine starting motor contacts denoted at 98 and 100, are a part of the engine starting motor circuit 94 extending from a grounded starting motor 102 to contact 98, and from contact 100 through a conventional ignition switch 104 to a battery 106. The back-up lamp circuit 92 includes the other set of contacts, the back-up lamp contacts designated 108 and 110, and extends from back-up lamps 112 to contact 108 and from contact 110 directly to the battery 106.

The engine starting motor contacts 98 and 100 and the back-up lamp contacts 108 and 110 coact with a switch contact 114 biased into engagement therewith as shown in FIGURE 6. The switch contact 114 is arranged so as to bridge the two contacts, either those for the back-up lamp circuit 92 or those for the engine starting motor circuit 94, such as to complete the respective circuit. This completion of the circuit takes place when the selector knob 30 is moved to the corresponding setting, e.g., in Reverse the switch contact 114 is revolved by the pulley assembly 48 so as to engage both of the back-up lamp contacts 108 and 110 and thereby complete the back-up lamp circuit 92 so that the lamps 112 will light. Similarly, when the selector knob 30 is moved to Neutral or Park, the switch contact 114 engages both of the engine starting motor contacts 98 and 100 and completes the engine starting motor circuit 94, assuming that the ignition switch 106 is also closed. The requirement that selector knob 30 be placed in the Neutral or Park setting, of course, insures that the transmission is not in any drive setting either Forward or Reverse when the engine is started.

Figure 4:
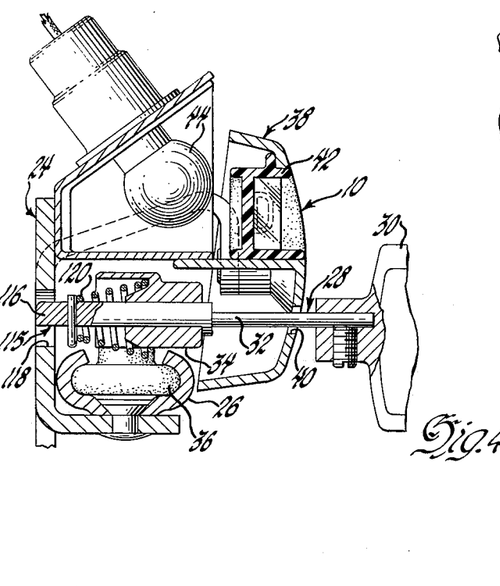
FIGURE 4 is a sectional view of the manually operable part taken along line 4—4 of FIGURE 2.
Figure 5:
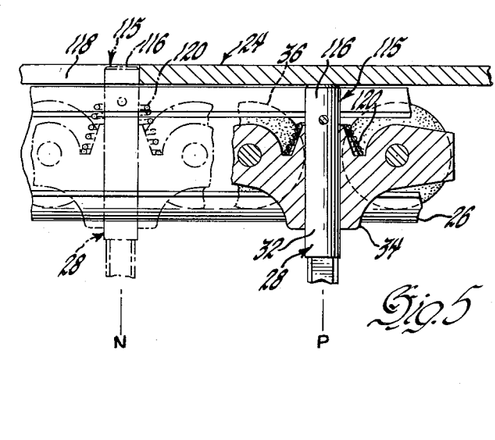
FIGURE 5 is a fragmentary sectional view of the manually operable part taken along line 5—5 of FIGURE 2.

Because it is desirable to prevent establishment of certain settings at different times except by a positive act on behalf of the operator, an inhibitor 115 as viewed in FIGURES 3, 4, and 5, is provided. In this embodiment the inhibitor 115 prevents the establishment of the Park setting through some inadvertent maneuver by the driver. This protects the parking brake since usually parking brakes are of the positive type; and if an attempt is made to engage the brake when the vehicle is moving, damage can result. Of course, this inhibitor could be utilized to prevent the careless or inadvertent establishment of any setting, Park being selected only for demonstration purposes. The inhibitor 115 has the end 116 of the selector shaft 32 biased, as best seen in FIGURES 4 and 5, into a back slot 118 in the bracket 24 by a spring 120. Since the back slot 118 only extends between the Reverse and Neutral settings, the selector knob 30 cannot be maneuvered beyond the Neutral setting and to the Park setting. This stop aspect is clearly displayed in FIGURE 5, for as seen the termination of the back slot 118 interferes with the further movement of the selector knob 30 needed to establish the Park setting. Therefore, it is necessary for the operator to pull outwardly on the selector knob 30 so that the selector shaft end 116 is moved out of the back slot 118, and then, the selector knob 30 can be moved to the Park position. This positive act requiring the operator to pull outwardly on the selector knob 30 discourages, as can be seen, any inadvertent establishment of the Park position.

Figure 1A:
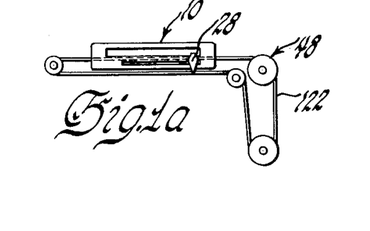
FIGURE 1a is a view illustrating a modification of the FIGURE 1 control.

In FIGURE 1a, a modification is illustrated in which a single cable denoted at 122 is utilized to transfer movements of the manually operable control 10 to the transmission control 18. This arrangement can be used where there is no assembly problem such as that overcome by the FIGURE 1 construction, for in the FIGURE 1 construction the manually operable control 10 can be installed on the vehicle body and the transmission control 18 can be completed so that when the body is installed on the chassis with the transmission therein, only a single connection is needed to complete the assemblage. Preferably, the output cable 72 is installed with the manually operable control 10 so that when the vehicle body is in place, only the two ends of the cable 72 need be joined by the clamp provision to the transmission shifter pulley 80 to constitute a complete assemblage.

From this description it can now be appreciated that the described control can be utilized to transfer motion over substantial distances without any lost motion and still with adequate leverage being possible through the correlation of the pulley sizes. In addition, the cable and pulley construction is readily adaptable to many different applications due to the several unique features provided.

The invention is to be limited only by the following claims:

1. In a control for a vehicle of the character having a transmission and plural accessory systems, the combination of manually operable control means positionable in a plurality of settings each corresponding to a transmission operating status, transmission control means maneuverable for conditioning the transmission for different operating statuses, means including a pulley for transferring movements between the manually operable control means and the transmission shifter means, and means revolvable with the pulley for rendering one of the plural accessory systems operative when the manually operable control means is in a selected setting.

2. In a control for a vehicle of the character having a transmission and plural accessory operating systems, the combination of manually operable control means positionable in a plurality of settings each corresponding to a transmission operating status, transmission control means maneuverable for conditioning the transmission for different operating statuses, means including a pulley for transferring movements between the manually operable control means and the transmission control means, means revolvable with the pulley for rendering one of the plural accessory operating systems operative when the manually operable control means is in a selected setting, and inhibiting means releasably preventing establishment of one of the settings by the manually operable control means.

3. In a control for a transmission, the combination of manually operable control means comprising a bracket, a manual shifter member, and a carriage for the shifter member, the bracket being provided with an elongated guide track, the carriage including a roller element engaging the guide track so as to permit the carriage to be maneuvered by the manual shifter member on the guide track along a longitudinal path relative thereto and to a plurality of settings each corresponding to a transmission operating status, transmission control means comprising a transmission shifter member arranged so as to condition the transmission for different operating statuses, and pulley means including cable structure for transferring movements between the manual control means and the transmission control means.

4. In a control for a transmission, the combination of manually operable control means comprising a bracket, a manual shifter member, and a carriage for the manual shifter member, the bracket being provided with an elongated guide track, the carriage including a roller element engaging the guide track so as to permit the carriage to be maneuvered by the manual shifter member on the guide track along a longitudinal path relative thereto and to a plurality of settings each corresponding to a transmission operating status, the manual shifter member being arranged so as to be maneuverable relative to the carriage, transmission control means comprising a transmission shifter member arranged so as to condition the transmission for different operating statuses, pulley means including cable structure for transferring movements between the manual control means and the transmission control means, and inhibiting means including a stop for preventing movement of the manual shifter member to one of the settings thereof until the manual shifter member is maneuvered relative to the carriage.

5. In a control for a vehicle of the character having a transmission and plural accessory operating circuits, the combination of manually operable control means comprising a bracket, a manual shifter member, and a carriage for the manual shifter member, the bracket being provided with an elongated guide track, the carriage including a roller element engaging the guide track so as to permit the carriage to be maneuvered by the manual shifter member on the guide track along a longitudinal path relative thereto and to a plurality of settings each corresponding to a transmission operating status, transmission control means comprising a transmission shifter member arranged so as to condition the transmission for different operating statuses, pulley means including cable structure for transferring movements between the manual control means and the transmission control means, and means revolvable with the pulley means for rendering different accessory operating circuits effective when the manual shifter member is in selected settings.

6. In a control for a vehicle of the character having a transmission and plural accessory operating circuits, the combination of manually operable control means comprising a bracket, a manual shifter member, and a carriage for the shifter member, the bracket being provided with a guide track, the carriage having revolvably mounted thereon a roller element engaging the guide track so as to permit the carriage to be maneuvered by the manual shifter member on the guide track along a longitudinal path relative thereto and to a plurality of settings each corresponding to a transmission operating status, the manual shifter member being arranged so as to be maneuverable relative to the carriage, transmission control means comprising a transmission shifter member arranged so as to condition the transmission for different operating statuses, means including a pulley and cable structure for together transferring movements between the manual control means and the transmission control means, inhibiting means including a stop on the bracket for preventing movement of the manual shifter member to one of the settings thereof until the manual shifter member is maneuvered relative to the carriage, and means revolvable with the pulley rendering different accessory operating circuits effective when the manual shifter member is in selected settings.

7. In a control for a transmission, the combination of manually operable control means comprising a bracket, a manual shifter member, and a carriage for the manual shifter member, the bracket being provided with a guide track, the carriage having mounted thereon a roller element adapted to engage the guide track so as to permit the carriage to be maneuvered by the manual shifter member on the guide track along a longitudinal path relative thereto and to a plurality of settings each corresponding to a transmission operating status, the manual shifter member being arranged so as to be maneuverable relative to the carriage, transmission control means comprising a transmission shifter member arranged so as to condition the transmission for different operating statuses, cable and pulley means for transferring movements between the manually operable control means and the transmission control means, the cable and pulley means including input and output cable structures coacting respectively with the manually operable and the transmission control means and a pulley member common to both structures and adapted to transfer drive therebetween, and inhibiting means including a stop for preventing movement of the manual shifter member to one of the settings thereof until the manual shifter member is maneuvered relative to the carriage.

8. In a control for a vehicle of the character having a transmission and plural accessory circuits, the combination of manually operable control means comprising a bracket, a manual shifter member, and a carriage for the manual shifter member, the bracket being provided with a guide track, the carriage having mounted thereon a roller element adapted to engage the guide track so as to permit the carriage to be maneuvered by the manual shifter member on the guide track along a longitudinal path relative thereto and to a plurality of settings each corresponding to a transmission operating status, transmission control means comprising a transmission shifter memferent operating statuses, cable and pulley means for transferring movements between the manually operable control means and the transmission control means, the cable and pulley means including input and output cable structures coacting respectively with the manually operable and the transmission control means and a pulley member common to both structures and adapted to transfer drive therebetween, and switch means revolvable with and operated by the pulley member when the manual control means is in a selected setting to render one of the plural circuits effective.

9. In a control for a vehicle having a transmission and plural accessory operating circuits, the combination of manually operable control means comprising a bracket, a manual shifter member, and a carriage for the manual shifter member, the bracket being provided with an elongated guide track, the carriage having revolvably mounted thereon a roller element adapted to traverse the guide track so as to permit the carriage to be maneuvered by the manual shifter member on the guide track along a longitudinal path relative thereto and to a plurality of settings each corresponding to a transmission operating status, transmission control means comprising a transmission shifter member arranged so as to condition the transmission for different operating statuses, cable and pulley means transferring movements between the manually operable control means and the transmission control means, the cable and pulley means including input and output cable structures coacting respectively with the manually operable and the transmission control means, a pulley member common to both structures and adapted to transfer drive therebetween, and switch means revolvable with the pulley member and arranged so as to render one of the plural accessory operating circuits effective when the manual shifter member is in a selected setting.

10. In a vehicle control for a vehicle of the character having a transmission and plural accessory operating circuits, the combination of manually operable control means comprising a bracket, a manual shifter member, and a carriage for the manual shifter member, the bracket being provided with a guide track, the carriage having revolvably mounted thereon a roller element adapted to traverse the guide track so as to permit the manual shifter member to be maneuvered along the guide track to a plurality of settings each corresponding to a transmission operating status, the manual shifter member being arranged so as to be maneuverable relative to the carriage, transmission control means comprising a transmission shifter member arranged so as to condition the transmission for different operating statuses, pulley means for transferring movements between the manually operable control means and the transmission control means, the pulley means including input and output cable structures coacting respectively with the manually operable and the transmission control means, a pulley member common to both structures for transferring drive therebetween, inhibiting means including a stop on the bracket for preventing movement of the manual shifter member to one of the settings until the manual shifter member is maneuvered relative to the carriage, and a switch carried by the pulley member and arranged so as to render one of the plural accessory operating units effective when the manual shifter member is in a selected setting.

11. In a control for a vehicle of the character having a transmission and plural accessory operating circuits including an engine cranking circuit and a backup light circuit, the combination of manually operable control means comprising a bracket, a manual shifter member, and a carriage for the manual shifter member, the bracket being provided with a guide track and a guide slot, the carriage having revolvably mounted thereon a roller element adapted to traverse the guide track so as to permit the manual shifter member to be maneuvered along the guide track to a plurality of transmission settings including Neutral, Reverse, and Park settings, the manual shifter member being arranged so as to be maneuverable relative to the carriage and into and out of engagement with the guide slot, means biasing the manual shifter member into engagement with the guide slot, transmission control means comprising a transmission shifter member arranged so as to condition the transmission for different operating statuses each corresponding to a transmission setting of the manual shifter member, pulley means for transferring movements between the manually operable control means and the transmission control means, the pulley means including input and output cable structures coacting respectively with the manually operable and the transmission control means, a pulley member common to both structures for transferring drive therebetween, inhibiting means including a stop on the bracket for preventing movement of the manual shifter member to the Park setting until the manual shifter member is maneuvered relative to the carriage and out of engagement with the guide slot, and a switch carried by the pulley member and arranged so as to render the back-up light and the engine starting motor circuits effective respectively in the Reverse and Neutral settings of the manual shifter member.

12. In a control for a vehicle transmission, the combination of manually operable control means comprising a bracket, a carriage, and a manual shifter member drive connected to the carriage, the bracket being provided with an elongated relatively straight guide track aligned so as to be substantially parallel to the longitudinal axis of the vehicle; the carriage including a roller element engaging the guide track so as to permit the carriage to be maneuvered on the guide track by the manual shifter member along a rectilinear path relative to the track and to a plurality of settings including Forward, Neutral, and Reverse, the settings being arranged so that the manual shifter member is moved from the Neutral setting forwardly to the Forward setting and rearwardly to the Reverse setting; transmission control means comprising a transmission shifter member arranged so as to condition the transmission for different operating statuses, and pulley means including cable structure for transferring movements between the manual control means and the transmission control means.

13. In combination, a vehicle body, a transmission, a transmission control, input means for the transmission control mounted on the vehicle body and positionable in a plurality of transmission settings each corresponding to a transmission operating status, output means for the transmission control mounted on the transmission and maneuverable to positions corresponding to each of the transmission settings for conditioning the transmission in the different transmission operating statuses, and cable and pulley means for transferring movements between the input means and the output means, the cable and pulley means including a first unitary cable structure having first and second supporting means mounted on the vehicle body and cable means interconnecting the first and second supporting means of the first unitary cable structure arranged to coact with the input means to move the first unitary cable structure in accordance with the movement of the input means, a second unitary cable structure having first and second supporting means and cable means readily detachably interconnecting the first and second supporting means of the second unitary cable structure coacting with the output means to move the output means in accordance with movement of the second unitary cable structure, the first supporting means on the second unitary cable structure being mounted on the vehicle body and the second supporting means of the second unitary cable structure being mounted on the transmission, and means for operatively connecting the first unitary cable structure to the second unitary cable structure for transferring drive therebetween.

14. In combination, a vehicle body, a transmission, a transmission control, input means for the transmission control mounted on the vehicle body and positionable in a plurality of transmission settings each corresponding to a transmission operating status, output means for the transmission control mounted on the transmission and maneuverable to positions corresponding to each of the transmission settings for conditioning the transmission in the different transmission operating statuses and cable and pulley means for transferring movements between the input means and the output means, the cable and pulley means including a first unitary cable structure having first and second supporting means mounted on the vehicle body and cable means interconnecting the first and second supporting means of the first unitary cable structure arranged to coact with the input means to move the first unitary cable structure in accordance with the movement of the input means, a second unitary cable structure having first and second supporting means and cable means readily detachably interconnecting the first and second supporting means of the second unitary cable structure coacting with the output means to move the output means in accordance with movement of the second unitary cable structure, the first supporting means of the second unitary cable structure being mounted on the vehicle body and the second supporting means of the second unitary cable structure being mounted on the transmission, and a pulley member common to both unitary cable structures and adapted to transfer drive therebetween.

15. In combination, a vehicle body, a transmission, a transmission control, input means for the transmission control mounted on the vehicle body and positionable in a plurality of transmission settings each corresponding to a transmission operating status, output means for the transmission control mounted on the transmission and maneuverable to positions corresponding to each of the transmission settings for conditioning the transmission in the different transmission operating statuses, and cable and pulley means for transferring movements between the input means and the output means, the cable and pulley means including a first unitary cable structure having first and second supporting means mounted on the vehicle body and cable means interconnecting the first and second supporting means of the first unitary cable structure arranged to coact with the input means to move the first unitary cable structure in accordance with the movement of the input means, a second unitary cable structure having first and second supporting means and cable means readily detachably interconnecting the first and second supporting means of the second unitary cable structure coacting with the output means to move the output means in accordance with movement of the second unitary cable structure, the first supporting means of the second unitary cable structure being mounted on the vehicle body and the second supporting means of the second unitary cable structure being mounted on the transmission, means for operatively connecting the first unitary cable structure to the second unitary cable structure for transferring drive therebetween, and inhibiting means releasably preventing establishment of one of the settings by the input means.

16. In combination, a vehicle body, a transmission, a transmission control, plural accessory systems associated with the vehicle body, input means for the transmission control mounted on the vehicle body and positionable in a plurality of transmission settings each corresponding to a transmission operating status, output means for the transmission control mounted on the transmission and maneuverable to positions corresponding to each of the transmission settings for conditioning the transmission in the different transmission operating statuses, and cable and pulley means for transferring movements between the input means and the output means, the cable and pulley means including a first unitary cable structure having first and second supporting means mounted on the vehicle body and cable means interconnecting the first and second supporting means of the first unitary cable structure arranged to coact with the input means to move the first unitary cable structure in accordance with the movement of the input means, a second unitary cable structure having first and second supporting means and cable means readily detachably interconnecting the first and second supporting means of the second unitary cable structure coacting with the output means to move the output means in accordance with movement of the second unitary cable structure, the first supporting means of the second unitary cable structure being mounted on the vehicle body and the second supporting means of the second unitary cable structure being mounted on the transmission, means for operatively connecting the first unitary cable structure to the second unitary cable structure for transferring drive therebetween, and means rendering one of the plural accessory systems operative when the input means is in a selected setting.

17. In combination, a vehicle body, a transmission, manually operable control means mounted on the vehicle body, the manually operable control means comprising a manual shifter member, guide means for the manual shifter member, the manual shifter member being arranged to coact with the guide means so as to be maneuverable to a plurality of settings each corresponding to a transmission operating status, transmission control means mounted on the transmission including a transmission shifter member arranged so as to condition the transmission for different operating statuses, and cable and pulley means for transferring movements between the manually operable control means and the transmission control means, the cable and pulley means including a first unitary cable structure having first and second supporting means mounted on the vehicle body and cable means interconnecting the first and second supporting means of the first unitary cable structure arranged to coact with the manually operable control means to move the first unitary cable structure in accordance with movement of the manually operable control means, a second unitary cable structure having first and second supporting means and cable means readily detachably interconnecting the first and second supporting means of the second unitary cable structure coacting with the transmission control means to move the transmission control means in accordance with movement of the second unitary cable structure, the first supporting means of the second unitary cable structure being mounted on the vehicle body and the supporting terminal means of the second unitary cable structure being mounted on the transmission, and a pulley member common to both unitary cable structures and adapted to transfer drive therebetween.

18. In combination, a vehicle body, a transmission, manually operable control means mounted on the vehicle body, the manually operable control means comprising a bracket, a manual shifter member, and a carriage for the manual shifter member, the bracket being provided with a guide track, the carriage having mounted thereon a roller element adapted to engage the guide track so as to permit the manual shifter member to be maneuvered along the guide track to a plurality of settings each corresponding to a transmission operating status, transmission control means mounted on the transmission comprising a transmission shifter member arranged so as to condition the transmission for different operating statuses, and cable and pulley means for transferring movements between the manually operable control means and the transmission control means, the cable and pulley means including a first unitary cable structure having first and second supporting means mounted on the vehicle body and cable means interconnecting the first and second supporting means of the first unitary cable structure arranged to coact with the manually operable control means to move the first unitary cable structure in accordance with movement of the manually operable control means, a second unitary cable structure having first and second supporting means and cable means readily detachably interconnecting the first and second supporting means of the second unitary cable structure coacting with the transmission control means to move the transmission control means in accordance with movement of the second unitary cable structure, the first supporting means of the second unitary cable structure being mounted on the vehicle body and the second supporting means of the second unitary cable structure being mounted on the transmission, and a pulley member common to both unitary cable structures and adapted to transfer drive therebetween.

References Cited in the file of this patent

UNITED STATES PATENTS

| | | |
|---|---|---|
| 930,934 | Browning | Aug. 10, 1909 |
| 1,625,188 | Blackburn | Apr. 19, 1927 |
| 1,682,947 | Wire | Sept. 4, 1928 |
| 2,075,436 | Grossman et al. | Mar. 30, 1937 |
| 2,191,543 | Osborne | Feb. 27, 1940 |
| 2,605,643 | Lebreton | Aug. 5, 1952 |
| 2,787,917 | Schroeder | Apr. 9, 1957 |
| 2,803,139 | Wright | Aug. 20, 1957 |
| 2,887,898 | Jovanovich et al. | May 26, 1959 |

FOREIGN PATENTS

| | | |
|---|---|---|
| 670,122 | Great Britain | Apr. 16, 1952 |
| 911,750 | Germany | Mar. 20, 1954 |